Oct. 18, 1966 J. R. DALE 3,279,961
COMPOUND SEMI-CONDUCTOR DEVICE AND METHOD OF MAKING SAME BY ALLOYING
Filed Jan. 8, 1964
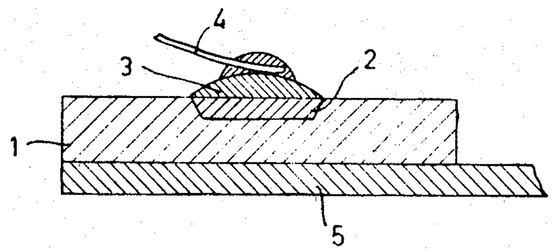
INVENTOR.
JOHN R. DALE
BY Frank R. Trifari
AGENT United States Patent Office 3,279,961

Patented Oct. 18, 1966

3,279,961

COMPOUND SEMI-CONDUCTOR DEVICE AND METHOD OF MAKING SAME BY ALLOYING

John Robert Dale, Brighton, England, assignor to North American Philips Company Inc., New York, N.Y., a corporation of Delaware Filed Jan. 8, 1964, Ser. No. 336,397
Claims priority, application Great Britain, Jan. 9, 1963, 1,036/63
14 Claims. (Cl. 148—185)

This invention relates to semiconductor devices.

It has been found difficult to produce good ohmic and p-n junctions in semiconductor bodies of materials comprising two or more elementary components by alloying.

The term "component" in relation to semiconductor material means the materials present in the body in substantially stoichiometric amounts. Exact stoichiometry is not, in general, achieved or desired in practice.

For gallium arsenide it is found that the use of tin or lead together with a significant impurity does not consistently provide a recrystallised layer, and gold together with a significant impurity alloys too rapidly to give reproducible results. Significant impurities alone are also not practically useful.

In alloying, a molten pool consisting of material to be alloyed and an adjacent volume of a semiconductor body is produced on a semiconductor body and cooled. On cooling, first a crystallised part forming an extenion of the crystal lattice of the body, and containing mainly the material of the semiconductor body together with a small amount of the material to be alloyed solidifies and is herein referred to as the recrystallised material, and thereafter the rest of the molten material containing mainly the material to be alloyed together with a small amount of the material of the semiconductor body solidifies.

According to the invention, in a method of manufacturing a semicondutcor device, bismuth is alloyed to a semiconductor body comprising two or more elementary components, neither of which is bismuth, to form an alloy junction.

The bismuth may be associated with other materials, for example, platinum, tin, tin and platinum, and silver.

The alloying of bismuth or bismuth containing contact materials for the formation of an alloy junction has several advantages, such as the possibility of producing an alloyed junction in an easy and reproducible way, the possibility of relatively low temperatures, for instance below 600° C., which reduces the risk of altering the properties of the remaining semiconductor material during alloying, the low risk of cracking after alloying, and the shallow penetration of the alloy in the body, while the penetration is easily controllable by alteration of the alloy composition.

The bismuth or the bismuth and the associated material or materials may be associated with a further material which is a significant impurity, that is which affects the conductivity without affecting the conductivity type or affects the conductivity type of the recrystallized zone.

Where bismuth is alloyed to the body together with one or more associated materials, the materials may all be alloyed to the body together by placing a pellet consisting of an alloy or intimate mixture of the materials on the body and heating. As an alternative, the materials to be alloyed may first be melted together and brought into contact with the body in the liquid state. As a further alternative, in some cases, the materials need not be alloyed to the body in a single operation, one or more of a plurality of materials being either alloyed separately to an existing alloyed recrystallized part of the body or added to a molten part already in existence on the body. In general, if materials are alloyed to the body one after the other, it is advisable to ensure that the depth of penetration of the liquid in the final alloying step is at least as great as that in the, or any, preceding alloying step.

The choice of alloying bismuth alone or bismuth together with another material or other materials and/or further significant impurity material(s) to a body depends on the kind of junction desired and the nature of the body which may be intrinsic, more lightly doped or more heavily doped material. In this connection it is mentioned that any dope initially contained in the body does not constitute a component of the semiconductor material as defined above.

Alloying may be effected in a conventional jig, for example, of graphite.

If bismuth and platinum are alloyed to the body, the amount of platinum may be up to 10% of the total of platinum and bismuth. Proportions which may be preferable are from 0.5 part of platinum and 99.5 parts of bismuth to 5 parts of platinum and 95 parts of bismuth.

If bismuth and tin are alloyed to the body, the proportions may vary from 75 parts of tin and 25 parts of bismuth to 0.1 part of tin and 99.9 parts of bismuth. Proportions which may be preferable are from 1 part of tin and 99 parts of bismuth to 55 parts of tin and 45 parts of bismuth.

If bismuth, tin and platinum are alloyed to the body, the proportion of platinum in addition to the proportions of tin and bismuth given in the preceding paragraph may advantageously be up to 10 parts. Proportions which may be preferable are from 1 to 55 parts of tin and from 1 to 5 parts of platinum, the balance up to 100 parts being of bismuth. An addition of platinum promotes further uniform wetting, recrystallisation, and penetration.

If bismuth and silver are alloyed to the body, the proportions may vary from 0.1 part of silver and 99.9 parts of bismuth to 30 parts of silver and 70 parts of bismuth. Proportions which may be preferable are from 1 part of silver and 99 parts of bismuth to 3 parts of silver and 97 parts of bismuth.

The parts given above are by weight.

In general, the proportions given above which it is stated may be preferable, give the conductivity types of recrystallised material on both n-type and p-type gallium arsenide as follows:

| Contact material: | Recrystallised material |
|---|---|
| Bi-Pt | p-type |
| Bi-Sn | n-type |
| Bi-Sn-Pt | n-type |
| Bi-Ag | p-type |
| Bi-Cd | p-type |

It is, however, pointed out that for a more heavily doped body the conductivity type of the recrystallised material may be determined by a significant impurity with which the body is initially heavily doped. For p-type recrystallised material, the use of cadminum as acceptor impurity is preferred.

If a further, significant-impurity is alloyed, the amount will usually be small compared with the amount of contact material and may typically be up to 2%, or up to 5%, of the weight of the material alloyed to the body. Where a significant impurity material is alloyed, it will, in general, determine the conductivity type of the recrystallised material. The conductivity type of the recrystallised material obtained depends on the materials used and the conditions of alloying in a manner that cannot be exactly predetermined but is consistent and may readily be determined by experiment in a particular case. For gallium arsenide, in general, a group VI significant impurity gives n-type recrystallised material, groups I and II significant impurity p-type, and a group IV significant impurity usually n-type. A group IV significant impurity can, however give p-type and the type depends on whether there is substitution for gallium or arsenic in the crystal lattice. Group VII significant impurities, in general, give n-type and, in general, group III and V materials are substantially neutral in effect.

Alloying to gallium arsenide may be carried out at about 500° C. at which temperature the material of the body does not appear to be unstable. The use of a higher temperature may result in a loss of arsenic from the body. An atmosphere of inert gas may be used, for example, super-pure argon, or the alloying may be carried out in vacuo.

The duration of heating for alloying depends on the materials and may be 2 hours, 3 hours, 4 hours or even 20 hours or longer. In general, it is desirable for the duration to be sufficient for a stable equilibrium condition to be reached.

The dependance of penetration depth on materials used is illustrated by the fact that heating a material consisting of 9 parts of bismuth and 1 part of tin for 4 hours at 500° C. followed by slow cooling to produce alloying gives a penetration depth of 10 microns and using 9 parts of bismuth to 11 parts of tin under identical conditions of alloying gives a penetration depth of 30 microns. It may be mentioned here that it is preferable to alloy the bismuth and tin together and to produce pellets of the BiSn alloy since it is not, in general, desirable to alloy first bismuth and thereafter tin to a gallium arsenide body.

The gallium arsenide bodies used may be produced from a single crystal by slicing and dicing. It is found that, as is usual, the results of alloying vary according to the crystal direction of the face of the body to which alloying is effected.

Although the particular information given above relates to gallium arsenide bodies, other semiconductor compounds may be used, for example, gallium phosphide or indium antimonide.

With the use of the method according to the invention, it has been possible to produce recrystallised material of a desired thickness which thickness is reproducible to a high degree and of a desired conductivity type.

The invention also relates to a semiconductor device when made with the use of the method according to the invention.

Specific examples of the method according to the invention are given in the following Table I.

TABLE I

| Alloy composition (parts by weight) | Conductivity type of recrystallised zone | Approximate Solidus Temperature, ° C. | Remarks |
|---|---|---|---|
| 90 Bi, 10 Sn | n | 150 | Penetration increases with increased Sn content. |
| 90 Bi, 10 Sn, 2 Pt | n | 150 | Platinum improves the wetting. |
| 75 Bi, 25 Sn, 5 Pt | n | 150 | Increased penetration. |
| 45 Bi, 55 Sn, 5 Pt | n | 150 | Alloy character is ductile and good control is obtained. |
| 98 Bi, 2 Se | n | 270 | Recrystallised layer of high resistivity. |
| 98 Bi, 2 As | n | 270 | Just barely adequate. |
| 99 Bi, 1 Cd | p | 150 | Cd is best acceptor. |
| 98 Bi, 2 Cd | p | 150 | Very consistent results. |
| 75 Bi, 25 Cd | p | 150 | Deeper penetration. |
| 50 Bi, 50 Cd | p | 150 | Still deeper penetration. |
| 98 Bi, 2 Ag | p | 260 | Useful for shallow penetration ohmic contacts. |
| 90 Bi, 10 Au | p | 266 | Deep penetration. |
| 98 Bi, 2 Zn | p | 260 | Zn not as good as cd. |
| 100 Bi | p | 272 | Small penetration. |
| 98 Bi, 2 Ba | | 270 | Intrinsic layer formed. |

Substantially similar results are obtained whether alloying is effected to an original p-type or an original n-type GaAs, the impurity concentration in the original body being about $10^{17}$ atoms/cc.

The following Tables II, III and IV give examples showing electrical properties:

TABLE II

| Alloy composition (parts by weight) | Rectification Ratio | Series Resistance | Breakdown voltage | Type of substrate |
|---|---|---|---|---|
| 98 Bi, 2 Ba | $3\times10^4$ | 14Ω | 1 v. at <5 μa. | P. |
| 98 Bi, 2 Ba | $1\times10^5$ | 200Ω | 15 v. at < 1 μa. | N. |

TABLE III.—DIODES WITH BREAKDOWN GREATER THAN 50 v.

| Alloy composition | Substrate Type | Rectification Ratio | Series Resistance, ohms | Breakdown Voltage |
|---|---|---|---|---|
| Bi-Sn-Pt | P | $1\times10^5$ | 600 | 105 v. at <1 μa. |
| Bi-Cd | N | $1\times10^5$ | 960 | 125 v. at <1 μa. |
| Bi-Se | N | $6\times10^3$ | 1,000 | 60 v. at ~5 μa. |
| Bi | N | $5\times10^7$ | 12.4 | 50 v. at <1 μa. |

TABLE IV.—DIODES WITH SERIES RESISTANCE LESS THAN 20 OHMS

| Alloy composition | Substrate Type | Rectification Ratio | Series Resistance, ohms | Breakdown Voltage |
|---|---|---|---|---|
| Bi-Sn-Pt | P | $3\times10^4$ | 11 | 18 v. at <10 μa. |
| Bi-Ba | P | $3\times10^4$ | 14 | 1 v. at <5 μa. |
| Bi-Cd | N | $2\times10^5$ | 14 | 35 v. at <1 μa. |
| Bi | N | $5\times10^7$ | 12.4 | 50 v. at <1 μa. |
| Bi-Cd | N | $7\times10^7$ | 7 | 1.2 v. at <1 μa. |

It is mentioned that except for the examples given in Table IV, the pellet sizes were approximately the same size (0.5 mm. diameter). For Table IV pellet sizes were about 2 mm. diameter.

One embodiment of the method of manufacturing a semiconductor device according to the invention, in this case a diode, will now be described, by way of further example, with reference to the accompanying diagrammatic drawing in which the figure is a cross-sectional view of a diode.

A spherical pellet comprising 45 parts of Bi, 55 parts of tin and 5 parts of Pt, by weight, and 0.5 mm. diameter is placed on one side of a die of p-type GaAs 50μ thick and doped with $10^{17}$ atoms/cc. of Zn and the whole heated at 500° C. for 30 minutes in vacuo to produce on cooling an n-type region. At the same time 98 Bi 2 Cd is alloyed to the other side of the die to provide an ohmic contact.

A silver plated molybdenum strip is thereafter soft-soldered to said other side of the die on a hot plate heated at 210° C., indium solder being provided as a layer on the die.

A nickel wire is soft-soldered, using tin-lead eutectic solder, to the resolidified layer and the diode so produced is encapsulated in any known manner.

The figure shows the p-type body 1 of GaAs, the n-type recrystallised region 2, the resolidified layer 3, the nickel wire 4 and the strip.

What is claimed is:

1. A semiconductor device comprising a body of a semiconductive compound of at least two elementary components other than bismuth, and a mass of metal surface alloyed to a surface portion of said body to form an alloy junction, said mass including at least 25 weight percent of bismuth.

2. A device as set forth in claim 1 wherein the compound is selected from the group consisting of gallium arsenide, gallium phosphide, and indium antimonide.

3. A semiconductor device comprising a body of a semiconductive compound of at least two elementary components other than bismuth, and a mass of metal surface alloyed to a surface portion of said body to form an alloy junction, said mass including bismuth as a major constituent with up to 10% by weight of platinum.

4. A device as set forth in claim 3 wherein the mass comprises 95–99.5 parts by weight of bismuth with 0.5–5 parts by weight of platinum.

5. A semiconductor device comprising a body of a semiconductive compound of at least two elementary components other than bismuth, and a mass of metal surface alloyed to a surface portion of said body to form an alloy junction, said mass comprising 25–99.9 parts by weight of bismuth with 0.1–75 parts by weight of tin.

6. A device as set forth in claim 5 wherein the mass comprises 45–99 parts by weight of bismuth, 1–55 parts by weight of tin, and up to 10 parts by weight of platinum.

7. A semiconductor device comprising a body of a semiconductive compound of at least two elementary components other than bismuth, and a mass of metal surface alloyed to a surface portion of said body to form an alloy junction, said mass comprising 70–99.9 parts by weight of bismuth with 0.1–30 parts by weight of silver.

8. A device as set forth in claim 7 wherein the mass comprises 97–99 parts by weight of bismuth and 1–3 parts by weight of silver.

9. A semiconductor device comprising a body of a semiconductive compound of at least two elementary components other than bismuth, and a mass of metal surface alloyed to a surface portion of said body to form an alloy junction, said mass comprising bismuth as a major constituent with up to 5% by weight of an impurity material selected from the group consisting of donors and acceptors.

10. A device as set forth in claim 9 wherein cadmium is included as an acceptor.

11. A device as set forth in claim 9 wherein the semiconductor compound is selected from the group consisting of gallium arsenide, gallium phosphide, and indium antimonide.

12. A method of making a semiconductor device comprising providing a semiconductive body of a compound of at least two elementary components other than bismuth, fusing to a surface of said body a mass of metal containing at least 25 weight percent of bismuth, and cooling the fused mass to recrystallize on the body a zone whose conductivity is determined by the composition of said mass to form an alloyed junction with the body.

13. A method as set forth in claim 12, wherein the mass comprises bismuth as a major constituent, an element selected from the group consisting of platinum, tin, and silver, and up to 5% by weight of an impurity selected from the group consisting of donors and acceptors.

14. A method as set forth in claim 13 wherein the mass components are prealloyed together, and a portion of said prealloy is then fused to the semiconductive body.

References Cited by the Examiner

UNITED STATES PATENTS

| | | | |
|---|---|---|---|
| 2,789,068 | 4/1957 | Maserjian | 148—185 |
| 2,820,185 | 1/1958 | Christian | 148—185 |
| 2,979,428 | 4/1961 | Jenny et al. | 148—185 |
| 3,010,857 | 11/1961 | Nelson | 148—185 |

DAVID L. RECK, *Primary Examiner.*

HYLAND BIZOT, *Examiner.*

R. O. DEAN, *Assistant Examiner.*